UNITED STATES PATENT OFFICE.

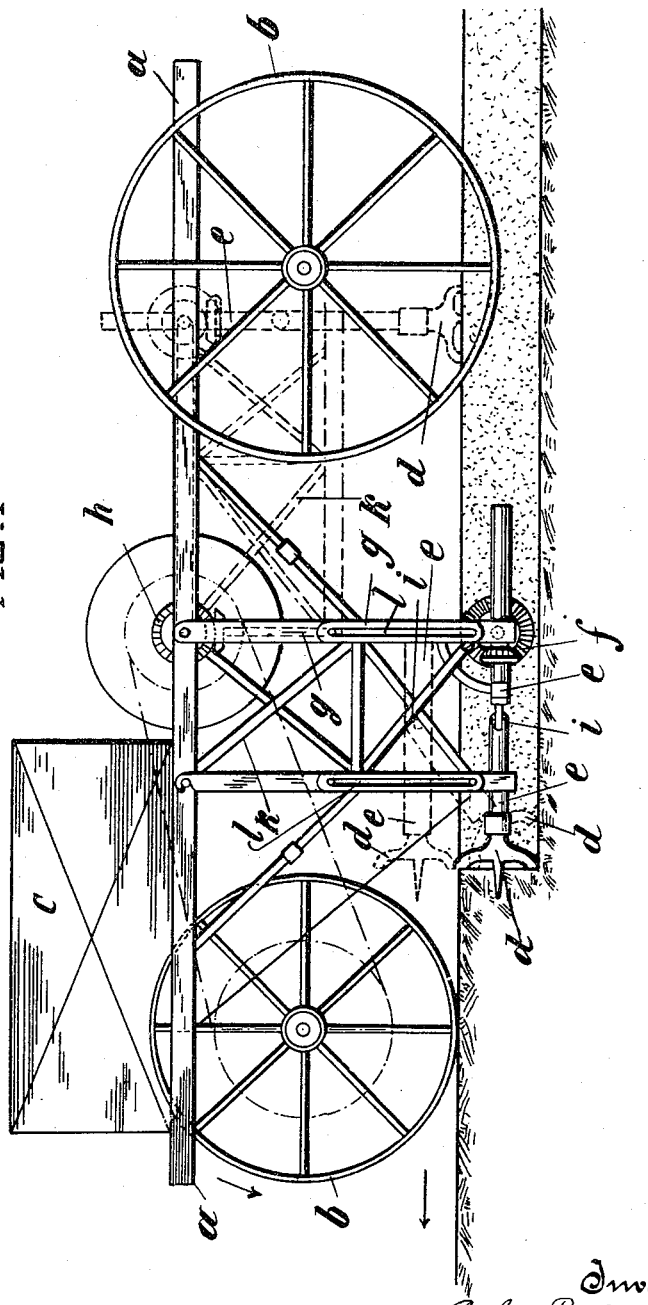

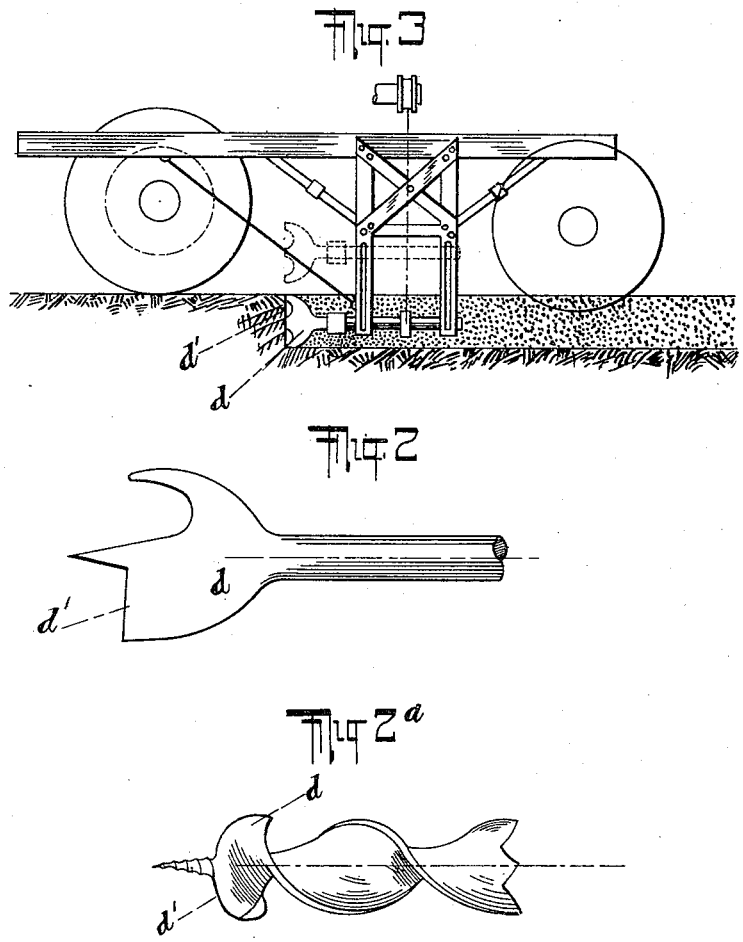

BOGHOS PACHA NUBAR, OF CAIRO, EGYPT.

MACHINE FOR PLOWING AND CULTIVATING LAND.

SPECIFICATION forming part of Letters Patent No. 658,459, dated September 25, 1900.

Application filed April 26, 1898. Serial No. 678,862. (No model.)

*To all whom it may concern:*

Be it known that I, BOGHOS PACHA NUBAR, director of Egyptian railways and telegraphs and of the port of Alexandria, and a resident of Cairo, Egypt, have invented Improvements in Machines for Plowing and Cultivating Land, of which the following is a full, clear, and exact description.

This invention relates to a rotary plow which differs, essentially, from ordinary plows, inasmuch as instead of forming a furrow by cutting and breaking up the soil by means of a plowshare it acts horizontally in the manner of a borer. The plowing-tool proper is mounted upon an automotor-carriage and receives a forward thrust by the movement of the vehicle, combined with a rotary movement in such manner that the tool disintegrates and triturates the soil to a width and depth equal to its diameter. By placing several of these tools parallel to each other in the same horizontal plane a breadth of soil equal in width to the distance between the two outside tools can be taken up at a time.

My invention is illustrated, by way of example, in the accompanying drawings, in which—

Figure 1 represents an elevation of my improved rotary plow. Figs. 2 and 2ª show various forms of plowing-tools, all operating upon the earth by their front faces. Fig. 3 shows a modification in which a single rotary tool is employed.

The automotor-carriage is constituted of a frame $a$, mounted on wheels $b$ and carrying any suitable motor $c$, operated by steam, oil, gasolene, electric, or other power, and driving-wheels $b$, preferably the front pair, by means of toothed chain or other gearing, and also the plowing-tools $d$, which are each provided with a shank and a head with a front cutting edge $d'$. These plowing-tools operate not after the manner of burrowing-tools to force their way into the soil, but operating by their front faces triturate and disintegrate the soil. Underneath or at the front of the carriage, as the case may be, is mounted a row of cutter shafts or hafts $e$, arranged parallel to each other in the direction of motion of the plow, upon the front ends of which shafts are mounted the rotary tools $d$, which serve to perforate, scrape, and pulverize the soil. The cutters are arranged to operate in a horizontal direction. Each cutter-shaft and its gearing is inclosed in a kind of metal sheath to prevent contact with the soil after it has been broken up.

The form of the cutters would vary according to the nature and degree of moisture of the soil, the depth of cut desired, and the degree of fineness to which the soil is to be reduced, and they would be provided with cutting edges $d'$, having surfaces of convex, concave, or other form, according to circumstances.

The cutters can be readily changed by detaching them from their shafts, to which they are fixed in the same way as the drills of drilling-machines, and replacing them by other tools of the form best suited for the work required to be performed.

Rotary motion is transmitted to the cutter-shafts by means of bevel-pinions $f$, which are geared by means of shaft $g$ with bevel-pinions $h$, operated by the driving-shaft. The speed at which the cutters are rotated and the rate of advance of the plow would vary according to the resistance of the soil.

In order to lessen the strain on the cutters in penetrating the soil and enable the apparatus to break up a larger extent of surface, it is generally of advantage to propel the plow slowly and work over a greater breadth of ground at a time by increasing the number of cutters. In their normal position the cutter-shafts lie in a horizontal plane.

The cutter-shafts are carried by a metal frame $k$, by which they are maintained in the marking position and which also allows of raising or lowering them by means of guide-slots $l$, for example.

The rotary plow herein described may be adapted for use as a harrow or clod-crusher, &c., by raising the cutters and turning them through an arc of ninety degrees by swinging of the frame upward until the shafts are brought into a vertical position, as shown in dot-and-dash lines at the right-hand end of Fig. 1, the cutters when thus brought to operate in a horizontal plane serving to pulverize the surface of the land after it has been plowed on being drawn over the ground. The apparatus may also be employed in this position for cutting trenches for draining purposes by fixing the cutter-shaft in a vertical position and giving the cutter the required length corresponding to the depth of trench to be sunk or by superposing several cutters one above the other.

The forward movement of the plow is effected, as before described, by power applied to the driving-wheels by the motor, and the width between the front wheels should be less than the distance between the two extreme cutters in order that said wheels may always travel upon the unplowed surface; but in certain cases and especially when the machine is too light to afford sufficient adhesion or when the cutters are placed at the front of the machine the wheels would travel on the loose plowed land and the machine would be hauled by means of a cable or other means of traction anchored at one end of the field and winding on a drum mounted on the frame of the machine.

It is to be understood that the construction of the machine may be varied without in any way departing from the principle of the invention. For example, a small machine with a single rotating cutter may be arranged to be driven by animal power or by means of a small gas-engine.

It will be observed that each of the tools $d$ is provided with a cutting edge $d'$ at the front thereof, which cutting edge executes a scraping cut, so that the bank of earth is operated upon by the front face of the tools.

I claim—

1. In a plow, the combination of a carriage, a swinging frame supported thereby, a plowing-tool having a front edge adapted to operate against a bank of earth and so mounted on the frame as to be supported thereby in a horizontal position, when the frame is in one position and in a vertical position when the frame is swung into another position, driving means carried by the carriage for rotating the plowing-tool and mechanism intervening between the driving means and the tool adapted to operate the tool when the tool is in either its horizontal position or its vertical position, substantially as described.

2. In a plow, the combination of a carriage, a substantially-horizontal shaft carried thereby and extending longitudinally thereof, a shaft for driving the said horizontal shaft, bevel-gearing intervening between the source of power, the counter-shaft and the horizontal shaft, a swing-frame for supporting the horizontal shaft so that the said shaft may be swung to operate vertically, the bevel-gear connections permitting this swinging without effecting the disconnecting of the shafts and a plowing-tool carried by the horizontal shaft.

The foregoing specification of my improvements in machines for plowing and cultivating land signed by me this 15th day of April, 1898.

BOGHOS PACHA NUBAR.

Witnesses:
EDWARD P. MACLEAN,
MAURICE HENRI PIGNET.